(12) United States Patent
Wei et al.

(10) Patent No.: US 9,948,221 B2
(45) Date of Patent: Apr. 17, 2018

(54) METHOD AND SYSTEM FOR ELIMINATING LOW FREQUENCY OSCILLATION BETWEEN GENERATORS

(71) Applicants: Qiang Wei, Zhengzhou (CN); Weimin Guo, Zhengzhou (CN)

(72) Inventors: Qiang Wei, Zhengzhou (CN); Weimin Guo, Zhengzhou (CN)

(*) Notice: Subject to any disclaimer, the term of this patent is extended or adjusted under 35 U.S.C. 154(b) by 96 days.

(21) Appl. No.: 14/906,512

(22) PCT Filed: Jul. 10, 2014

(86) PCT No.: PCT/CN2014/081930
§ 371 (c)(1),
(2) Date: Jan. 20, 2016

(87) PCT Pub. No.: WO2015/010541
PCT Pub. Date: Jan. 29, 2015

(65) Prior Publication Data
US 2016/0164444 A1    Jun. 9, 2016

(30) Foreign Application Priority Data
Jul. 20, 2013  (CN) .......................... 2013 1 0321108

(51) Int. Cl.
*H02P 9/10*  (2006.01)
*H02M 1/12*  (2006.01)
(Continued)

(52) U.S. Cl.
CPC .............. *H02P 9/105* (2013.01); *H02J 3/24* (2013.01); *H02M 1/12* (2013.01); *H02P 21/05* (2013.01); *Y02E 60/728* (2013.01); *Y04S 10/265* (2013.01)

(58) Field of Classification Search
CPC . H02P 9/105; H02P 21/05; H02M 1/12; H02J 3/24
See application file for complete search history.

(56) References Cited

U.S. PATENT DOCUMENTS 6,476,521 B1 * 11/2002 Lof .......................... H02J 3/24
                                                                307/102
8,941,372 B2 * 1/2015 Gadiraju ................... H02J 3/00
                                                                324/103 R
(Continued)

OTHER PUBLICATIONS

Wei, Xin, Multi-machine Power System PSS Research Based on Wide-Areas Measurement system, Huazhong University of Science and Technology Master's degree paper, Feb. 1, 2007.
(Continued)

*Primary Examiner* — Viet Nguyen
(74) *Attorney, Agent, or Firm* — Novoclaims Patent Services LLC; Mei Lin Wong

(57) ABSTRACT

A method and system for eliminating the low-frequency oscillation between generators. By way of measuring the absolute rotor angle of a generator and controlling the rotor rotational speed, the absolute rotor angles obtained through measurement are the same when each GPS pulse per second signal arrives. The absolute rotor angles are angles of the internal potential Eq of the generator leading a GPS reference vector. Through the absolute rotor angle, zero steady state error control of the frequency and the rotor angle is achieved and the position of the generator rotor can remain unchanged in the PPS determined rotating coordinate system, thus suppressing the low-frequency oscillation better even without the need of remote measurement and achieving automatic local balance of active power during variation of loads. Accordingly, the power fluctuation on transmission lines is decreased while safe and stable operation of a large-scale interconnected power grid is achieved.

12 Claims, 3 Drawing Sheets

(51) Int. Cl.
*H02J 3/24* (2006.01)
*H02P 21/05* (2006.01)

(56) References Cited

U.S. PATENT DOCUMENTS

| | | | | |
|---|---|---|---|---|
| 2008/0265846 | A1* | 10/2008 | Laubrock | F03D 7/0272 322/29 |
| 2009/0091303 | A1* | 4/2009 | Schweitzer, III | H02K 11/22 322/99 |
| 2012/0083935 | A1* | 4/2012 | Wells | H02J 3/381 700/292 |
| 2012/0232820 | A1* | 9/2012 | Wilson | H02J 3/24 702/72 |
| 2014/0343881 | A1* | 11/2014 | Johannsson | H02J 3/18 702/65 |
| 2015/0005967 | A1* | 1/2015 | Johannsson | H02J 3/24 700/287 |

OTHER PUBLICATIONS (Jan. 2, 2007) the text parts 2 and 5. (D1 as cited in ISR).
Hu, Jiong et al. Research of Synchronous Generator Angle Measurement, Power System Technology, vol. 30, No. S2, Dec. 30, 2013 (Dec. 30, 2013), pp. 354-357 (D2 as cited in ISR).
Majumder, R.; Ghosh, A.; Ledwich, G.; Zare, F., Angle droop versus frequency droop in a voltage source converter based autonomous microgrid, Power & Energy Society General Mee.
Majumder, R.; Ghosh, A.; Ledwich, G.; Zare, F.,Operation and control of hybrid microgrid with angle droop controller, TENCON 2010—2010 IEEE Region 10 Conference,pp. 509.
Majumder, R.; Ledwich, G.; Ghosh, A.; Chakrabarti, S.; Zare, F.,Droop Control of Converter-Interfaced Microsources in Rural Distributed Generation,Power Delivery, IEEE Transac.
Majumder, R.; Chaudhuri, B.; Ghosh, A.; Majumder, R.; Ledwich, G.; Zare, F.,Improvement of Stability and Load Sharing in an Autonomous Microgrid Using Supplementary Droop Cont.

\* cited by examiner

METHOD AND SYSTEM FOR ELIMINATING LOW FREQUENCY OSCILLATION BETWEEN GENERATORS

CROSS REFERENCE OF RELATED APPLICATION

This is a national phase national application of an international patent application number PCT/CN2014/081930 with a filing date of Jul. 10, 2014, which claimed priority of one foreign application which is filed in China: application number 201310321108.6 and filing date Jul. 20, 2013. The contents of these specifications, including any intervening amendments thereto, are incorporated herein by reference.

BACKGROUND OF THE PRESENT INVENTION

Field of Invention

The present invention relates to technologies in operation and control of electric power system, and more particularly to method and system for eliminating low-frequency oscillation between generators.

Description of Related Arts

At present, after an electric power system is subjected to a disturbance, insufficient damping or negative damping may lead to oscillation of approximately equal amplitude or increased amplitude to occur in the rotor angle, the rotating speed of the power generator and the related electrical quantities (such as the power flow on transmission lines, the bus voltages, etc.). Since the frequency is generally about 0.1-2.5 Hz, this oscillation is referred to as low-frequency oscillation in power system. Low-frequency oscillation can be divided into two types, which are local mode and inter-area mode. Generally speaking, the more is the number of units, the greater is the area, then the lower is the oscillation frequency.

After the power grids are interconnected in a large scale, low frequency oscillation may lead to dramatic fluctuation of power on transmission lines, which is a very important problem to be solved in power transmission control. Although PSS (Power System Stabilizer) can effectively damp the local low frequency oscillation, it cannot effectively damp the inter-area oscillation because only local information is used. As a result, a number of wide area damping controls in which the wide area information is integrated to the PSS are proposed. However, the questions as to how to select the measuring/feedback signal, and how to prevent delay in signal transmission which will lead to worsening control effect remain to be resolved.

SUMMARY OF THE PRESENT INVENTION

Accordingly, a technical problem for the present invention to solve is a method of eliminating low frequency oscillation between power generators in which when each time the PPS (pulse per second) signal arrives, the rotor of the power generator will rotate to the same position.

The method for eliminating low frequency oscillations between power generators, comprising the steps of: measuring the absolute rotor angle of the power generator; the absolute rotor angle refers to the leading angle of the internal potential Eq of a power generator from GPS reference vectors in a rotating coordinate system; controlling the rotating speed of the rotor of the power generator such that when each time the GPS PPS signal arrives, the absolute rotor angle being measured are the same, or the value of the absolute rotor angle is reverted to a target absolute rotor angle after disturbance.

According to an embodiment of the method of the present invention, furthermore, through control and adjustment in mechanical power output of turbine or output power of the power generator, adjusting the rotating speed of the rotor.

According to an embodiment of the method of the present invention, furthermore, a PID turbine controller adjusting the position of a regulating valve of the turbine based on parameters inputted, controlling the mechanical power output of the turbine, increasing or decreasing the rotating speed of the rotor, thereby the value of the absolute rotor angle is reverted to the target absolute rotor angle after disturbance; the parameters include: the absolute rotor angle, the target absolute rotor angle.

According to an embodiment of the method of the present invention, furthermore, a PID energy storage unit controller controlling the energy storage unit to enter into power storage mode or power generating mode, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle; wherein the energy storage unit consume more electromagnetic power when storing energy such that the speed of the generator rotor is reduced, while the energy storage unit provides electromagnetic power under the power generating mode and reduces the loading of the power generator, then the speed of the power generator rotor is increased.

According to an embodiment of the method of the present invention, furthermore, a PID excitation controller controlling an exciter to adjust the excitation voltage based on parameters inputted, changing the internal potential and output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

The present invention solves the technological problem by providing a system of eliminating low frequency oscillation between generators, when each time the pulse per second signal arrives, the rotor of the power generator will rotate to the same position.

The system of eliminating low frequency oscillation between generators, comprising: a synchronized phasor measurement unit, arranged for measuring the absolute rotor angle of the power generator; the absolute rotor angle refers to the leading angle of the internal potential Eq of the power generator from GPS reference vectors in a rotating coordinate system; a rotor rotating speed control unit, arranged for controlling the rotating speed of the rotor of the power generator such that when each time the GPS pulse per second signal arrives, the absolute rotor angle being measured are the same, or the value of the absolute rotor angle is reverted to a target absolute rotor angle after disturbance.

According to an embodiment of the method of the present invention, furthermore, the rotor rotating speed control unit adjusts the rotating speed of the rotor through control and adjustment in mechanical power output of turbine or output power of the power generator.

According to an embodiment of the method of the present invention, furthermore, the rotor rotating speed control unit comprises a PID turbine controller; the PID turbine controller adjusting the position of a regulating valve of the turbine based on parameters inputted, controlling the mechanical power output of the turbine, increasing or decreasing the rotating speed of the rotor, thereby the value of the absolute rotor angle is reverted to the target absolute rotor angle after disturbance; the parameters include: the absolute rotor angle, the target absolute rotor angle.

According to an embodiment of the method of the present invention, furthermore, the rotor rotating speed control unit comprises a PID controller with energy storage unit; the PID controller controlling the energy storage unit to enter into power storage mode or power generating mode, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle; wherein the energy storage unit consume more electromagnetic power when storing energy such that the speed of the power generator rotor is reduced, while the energy storage unit provides electromagnetic power under the power generating mode and reduces the loading of the power generator, then the speed of the power generator rotor is increased.

According to an embodiment of the method of the present invention, furthermore, the rotor rotating speed control unit comprises a PID excitation controller; the PID excitation controller controlling an exciter to adjust the excitation voltage based on parameters inputted, changing the internal potential and output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle;

According to the method and system for eliminating low frequency oscillation between generators of the present invention, through the control of the absolute rotor angle of the power generator, the zero steady-state error control between the frequency and the rotor angle is realized. The position of the rotor of the power generator in the PPS determined rotating coordinate system is fixed (remain unchanged). The zero steady-state error control of the frequency and the rotor angle is realized in power system. Under the condition of not requiring remote measurement, the suppression of low frequency oscillation is better. In addition, automatic local balance of active power is achieved when load changes, power fluctuation in the transmission lines is decreased and safe and stable operation of large scale interconnected electric grids is ensured.

BRIEF DESCRIPTION OF THE DRAWINGS

In order to more clearly illustrate the technological solutions in the embodiments of the present invention or the existing arts, the drawings required for the description of the embodiments of the present invention or the existing arts are briefly provided as follows. Obviously, the following drawings description includes the illustrative embodiments for the present invention and is exemplary only. One skilled in the art in the present field of invention, without the need of inventiveness and diligent, can derive additional drawings based on the drawings of the present invention.

DETAILED DESCRIPTION OF THE PREFERRED EMBODIMENT

The preferred embodiment of the present invention is further described fully with the accompanying drawings as follows in which the exemplary embodiments of the present invention is described. The followings content will, with the help of the accompanying drawings of the embodiments of the present invention, clearly and fully describe the technological features of the embodiments of the present invention. Obviously, the following drawings description includes the illustrative embodiments for the present invention and is exemplary only. One skilled in the art in the present field of invention, without the need of inventiveness and diligent, can derive additional drawings based on the drawings of the present invention.

In recent years, with the development of measurement technology in synchronized phasor measurement unit (PMU), the technology of precise measurement of rotor angle in power generator, which refers to the angle of the Q-axis of the generator rotor in a rotating coordinate system determined by PPS, is matured gradually. This development provides new possibilities, turning the control of power generator from speed (rotating speed) control to position (rotor angle) control.

Since rotor angle is an integration of rotating speed, the control of rotor angle can therefore realize the control of position and speed simultaneously. More importantly, if the rotor angle can be controlled accurately, each of the power generators in the system will have a fixed position in the rotating coordinate system determined by pulse per second (PPS), and the oscillation between them will be eliminated accordingly.

Figure 1:
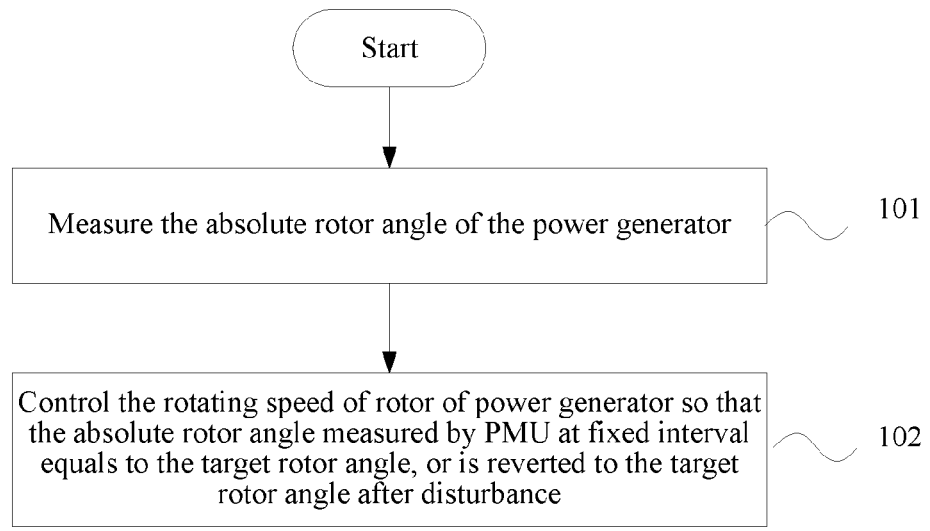
FIG. 1 is a flow chart of the method of eliminating low frequency oscillation between generators according to an embodiment of the present invention.

FIG. 1 is a flow chart of the method of eliminating low frequency oscillation between generators according to an embodiment of the present invention. As shown in FIG. 1:

Step 101, measuring the absolute rotor angle of the power generator. The absolute rotor angle refers to the leading angle of the internal potential Eq of the power generator from GPS reference vectors.

Step 102, controlling the rotating speed of the rotor of the power generator such that when each time the GPS pulse per second signal arrives, the absolute rotor angle being measured are the same, or the value of the absolute rotor angle is reverted to a target absolute rotor angle after disturbance.

The present invention can realize zero steady-state error control (with integration block) or droop control (without integration block) for the angle. When the angle is subject to zero steady-state error control, the controller will control the rotating speed of the rotor of the power generator and try to make the absolute rotor angle being measured are the same as the target absolute rotor angle when each time the GPS pulse per second signal arrives. When the angle is subject to droop control, the controller will control the value of the absolute rotor angle to revert to the target absolute rotor angle after disturbance, but the absolute rotor angle after adjustment is not necessarily equal to the target absolute rotor angle.

According to an embodiment of the present invention, other angle of the rotor with reference to the GPS reference vectors can also be used as a reference quantity. The rotating speed of the rotor can be controlled such that the reference quantity being measured is the same when each time the PPS arrives.

The main idea of the method of eliminating low frequency oscillation between generators of the present invention is: when each time the pulse per second signal reaches, the rotor of the power generator is rotated to the same position. In this way, the absolute rotor angle measured by the PMU will remain unchanged, the position of each power generator in the rotating coordinate system determined by the pulse per second signal remains unchanged, and the frequency will also be precisely 50 Hz (or 60 Hz). This way, precision control of the power angle and the rotating speed (frequency) can be achieved at the same time, and the low frequency oscillation is eliminated.

The swing equations of the power generator are:

$$\frac{d\omega}{dt} = \frac{1}{T_j}(P_m - P_e) \quad (1)$$

$$\frac{d\delta}{dt} = \omega_0(\omega - 1) \quad (2)$$

ω is the rotating speed in per unit system, Tj is the time constant of the power generator, Pm is the mechanical power of the turbine output, Pe is the electromagnetic power of the generator output. In the equation (2), δ is the rotor angle of the power generator. $\omega_0$ is the rated speed.

According to the above equations, the control of the rotor angle δ of the power generator can be realized through changing the rotating speed ω of the power generator. If the rotor angle is leading, then the rotor of the power generator should be controlled to slow down, then the measured rotor angle being measured will gradually return to the expected value, and vice versa.

In order to change the rotating speed ω of the power generator, the mechanical power provided to the rotor and the electromagnetic power output to the grid from the rotor should be adjusted. Therefore, the control of rotor angle can be realized through the control of mechanical power or through the control of electromagnetic power. In these two implementation method, the later can be divided into two branches, which are utilization of energy storage/adjustable power consuming device to affect the electromagnetic power, and through the adjustment of excitation to affect the electromagnetic power.

Figure 2:
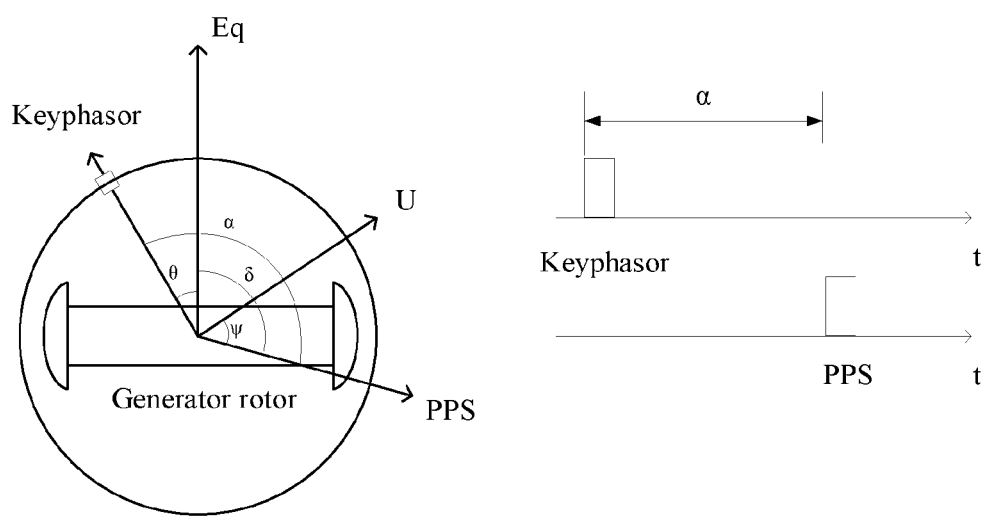
FIG. 2 is a schematic illustration of measuring the absolute rotor angle in the method of eliminating low frequency oscillation between generators according to an embodiment of the present invention.

FIG. 2 is a schematic illustration of measuring the absolute rotor angle in the method of eliminating low frequency oscillation between generators according to an embodiment of the present invention. PMU can utilize keyphasor signal to measure the absolute rotor angle directly. The absolute rotor angle refers to the phase position of the cosine wave of excitation of power generator relative to the standard (rated frequency) cosine wave which begins at the beginning of the whole second from the coordinated universal time (UTC).

Referring to FIG. 2 of the drawings, the absolute rotor angle refers to the leading angle δ of the internal potential Eq from GPS reference vectors. The angle ψ, which is the angle between positive sequence terminal voltage U and the GPS reference vectors, is the absolute angle of the positive sequence terminal voltage.

Through measuring the time difference between the arrival time of the keyphasor pulse and the arrival time of the PPS signal, a can be obtained. Then the initial phase angle θ is deducted to obtain the absolute rotor angle. It is observed that the absolute rotor angle is not the angle of the rotor Q-axis relative to another power generator in the system. It is the angle relative to the absolute time scale (PPS). Therefore, to obtain this value, no remote information is required. In addition, it can also be proved that if there is any changes of running status of the power generator, the absolute rotor angle obtained from the keyphasor signal always coincide with the Q-axis.

According to the preferred embodiment of the present invention, a new type of turbine controller (governor) can be used to affect the rotating speed of the rotor through PID control and adjustment of mechanical power of the turbine output.

PID (proportion-integral-differential) controller is the most widely applied industrial controller. PID controller is simple and easy to understand, no prerequisite requirements such as a precise system model is required for use. Therefore it becomes the most widely used controller.

PID controller is formed by proportional component (P), integral component (I) and differential component (D). The relation between its input e(t) and output u(t) is:

$$u(t)=kp[e(t)+1/TI\int e(t)dt+TD*de(t)/dt].$$

In the formula, the upper and lower limit of integral is 0 and t respectively. Therefore, its transfer function is:

$$G(s)=U(s)/E(s)=kp[1+1/(TI*s)+TD*s].$$

Where kp refers to proportional factor. TI refers to integration time constant. TD refers to differential time constant.

PID controller can also include the proportion component and the differential component only and does not include the integral component. In this form, the PID controller becomes the PD controller. This type of controller cannot realize zero steady state error adjustment of the control quantity but is also a type of implementation method.

The new turbine controller in this embodiment adjusts the position of a regulating valve of the turbine based on parameters inputted to control the mechanical power output of the turbine (Pm), through increasing or decreasing the rotating speed of the rotor, the value of the absolute rotor angle equals the target absolute rotor angle, or is reverted to the target absolute rotor angle after disturbance. The parameters include: absolute rotor angle, the target absolute rotor angle.

Figure 3:
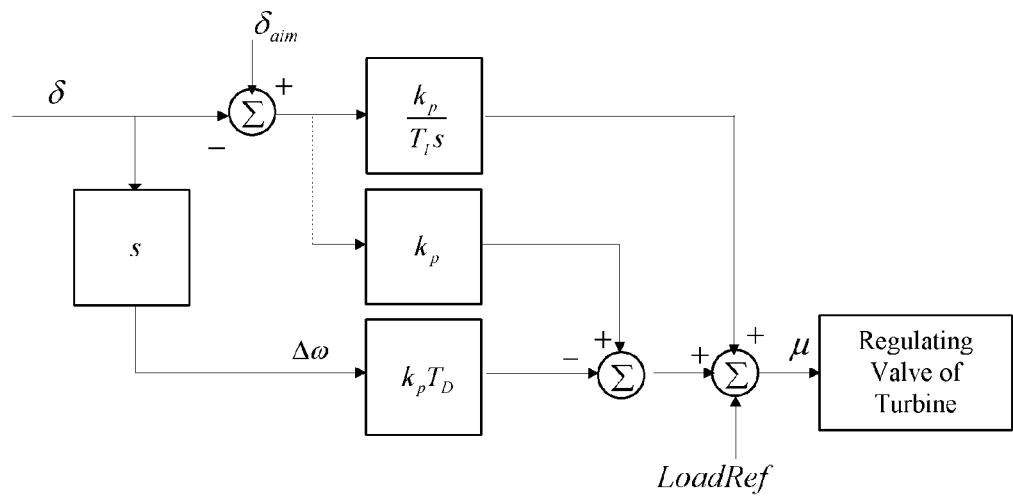
FIG. 3 is a schematic illustration of control and adjustment in mechanical power output of turbine in the method of eliminating low frequency oscillation between generators according to an embodiment of the present invention.

FIG. 3 shows the structure of the new type turbine controller (governor). In the drawings, δ refers to the rotor angle of the power generator measured by PMU. $\delta_{aim}$ refers to the target rotor angle given by the dispatching center, this value is obtained from power flow calculation results (note that the reference is not another power generator but PPS). The differential value of the measured rotor angle is the rotating speed deviation Δω (the rotating speed obtained by measurement can also be used to get this value). Loadref is used so that the integral block output can be set to zero when the target value is changed. The output μ of the block diagram is the degree of opening of the regulating valve.

In the new controller, the proportion component is the basic necessary component. The differential component is used to provide damping torque according to changes in speed to ensure that oscillation will not occur when the proportional gain is relatively large. The integral component is used to ensure that zero steady state error control is realized finally. However, it should be noted that the integral component in the structure is not necessary. If there is no integral component, only the zero steady state error control of the frequency can be realized but the zero steady state error control of the rotor angle cannot be realized.

In this embodiment of the present invention, enter a difference value between the absolute rotor angle and the target rotor angle to the proportion component and differential component of the PD or PID controller for the turbine. Under the condition of zero steady state error control, enter a difference value between the absolute rotor angle and the target rotor angle to the integral component of the PID controller for the turbine.

According to this preferred embodiment, the controller further comprises additional accessory block (not shown in FIG. 3). The accessory block is arranged to block the proportion and the integral component while maintaining the differential component when the upper limit of the power output of the turbine is reached or the system frequency changes rapidly so as to prevent the controller to enter into a nonlinear region and leading to chaos.

The advantages of this control method are that no additional energy storage/adjustable power consuming device is required, and the voltage of the terminal of the power generator is also not affected. The disadvantages are the requirement of frequent adjustment of the regulating valve of the turbine, which affect the work life of the regulating valve.

According to another preferred embodiment of the present invention, the PID energy storage controller can be used. The PD or PID controller controls the energy storage unit to enter into storage mode or power generating mode to change the output power of the power generator based on the parameters inputted, through increasing or decreasing the rotating speed of the rotor, the value of the absolute rotor angle is equal to the target absolute rotor angle, or the value of the absolute rotor angle is reverted to the target absolute rotor angle after disturbance. The parameters include: absolute rotor angle, the target absolute rotor angle.

Figure 4:
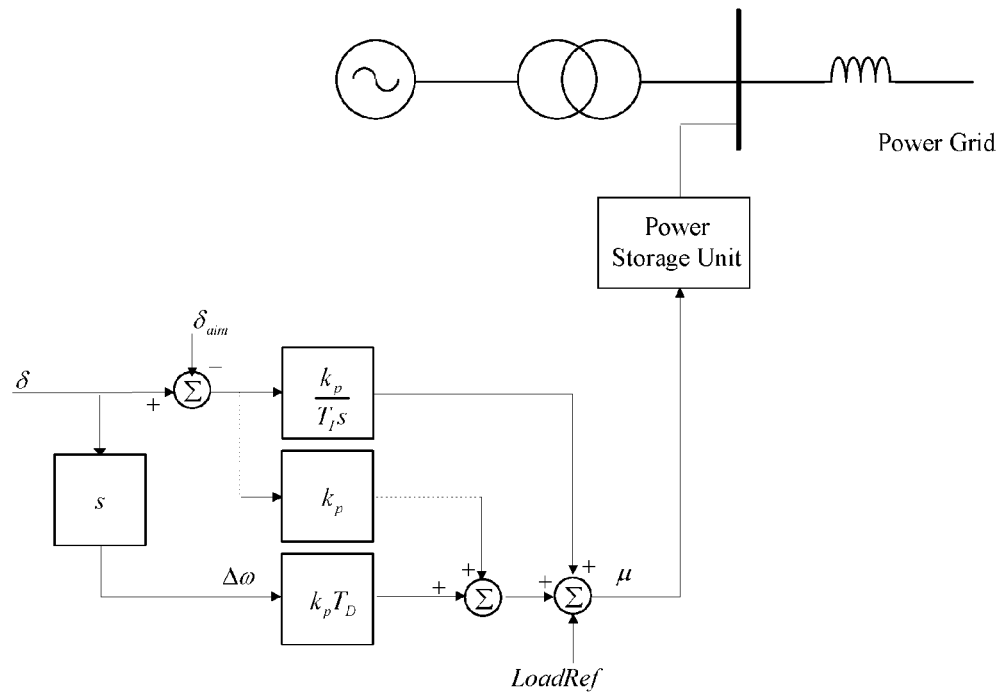
FIG. 4 is a schematic illustration of control in power storage device in the method of eliminating low frequency oscillation between generators according to an embodiment of the present invention.

The control method as shown in FIG. 4 is different from the control method as shown in FIG. 3. The output power of the turbine Pm is not affected, instead, the output power of the power generator Pe is affected.

In this preferred embodiment, the PID controller as described for the above preferred embodiments can also be used. However, the symbols for entering into the comparison blocks are required to be negated. The output command from the PID energy storage controller is sent to the energy storage/adjustable energy consuming unit, such as power plant mill/water pump driven by frequency converters, but not the regulating valve of a turbine.

For the energy storage unit, the adjustment command can direct the unit to enter into an energy storage mode or a power generating mode. The storage of greater power will consume extra electromagnetic power such that the speed of the power generator rotor is reduced. The power generating mode provides electromagnetic power to the system such that the loading of the power generator is reduced and the speed of the power generator rotor is increased.

In view of the application of the present invention, the energy storage function is not important. Instead, what's important is the feature of adjustment in power consumption. The adjustment of device running status equals to changing the output of the turbine. Obviously, from this angle, the adjustable power consumption device can also fully achieve the same function.

According to this preferred embodiment, the integral component is not necessary. Also, when this preferred embodiment is used, additional accessory block (not shown in FIG. 4) is also required. The accessory block is used to block the proportion and the integral component while maintaining the differential component when the upper limit of storage/consumption of the energy storage device is reached or the system frequency changes rapidly so as to prevent the controller to enter into a nonlinear region and leading to chaos.

The advantages of this control method are that the terminal voltage of the power generator is also not affected, and no frequent adjustment of the regulating valve of the turbine is required. The disadvantage is that additional device investment is required.

According to another preferred embodiment of the present invention, PD or PID excitation controller is used to adjust excitation voltage based on parameters inputted to change the internal potential and output power of the power generator, through increasing or decreasing the rotating speed of the rotor, the value of the absolute rotor angle equals the target absolute rotor angle, or is reverted to the target absolute rotor angle after disturbance. The parameters inputted include: absolute rotor angle, the target absolute rotor angle.

Figure 5:
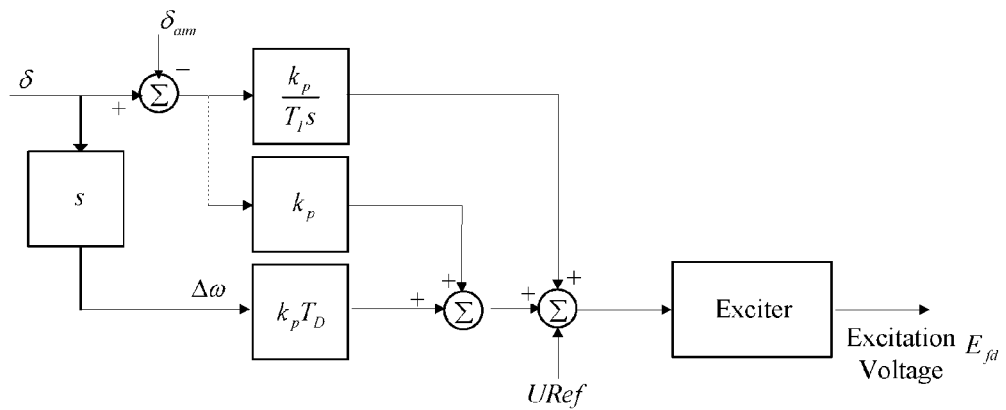
FIG. 5 is a schematic illustration of control in excitation voltage in the method of eliminating low frequency oscillation between generators according to an embodiment of the present invention.

Providing a magnetizing field to the power generator refers to as excitation. The required voltage for providing the magnetizing field refers to as excitation voltage, the current produced refers to as excitation current. As shown in FIG. 5 of the drawings, the structure of a PID excitation controller, through adjustment in excitation voltage to realize the control of rotor angle, is provided. Compared to a conventional excitation controller, the input signal of this controller is changed from terminal voltage to rotor angle, and additional integral component is added to realize the zero steady state error control (but the integral component is not an essential component).

This type of excitation method is dramatically different from the conventional method. When this structure is used, the generator terminal voltage is not maintained constant and will change continuously with the changes in rotor angle such that changes to the internal potential and output electromagnetic power will occur, then the rotating speed of the rotor is affected and finally the target of constant rotor angle is achieved.

The advantages of this control method are that: no frequent adjustment of the regulating valve of the turbine is required, and no additional energy storage/adjustable energy consuming device is required.

The disadvantage is that the terminal voltage of the power generator is subject to relative big changes and adjustment of turbine power is needed for adjustment to the terminal voltage. The results are that the excitation adjusts the active power while the governor adjusts the terminal voltage. This type of adjustment method is very different when compared with conventional control (the excitation affects reactive power/voltage, while the governor affects active power), and it is not convenient to adjust.

Figure 6:
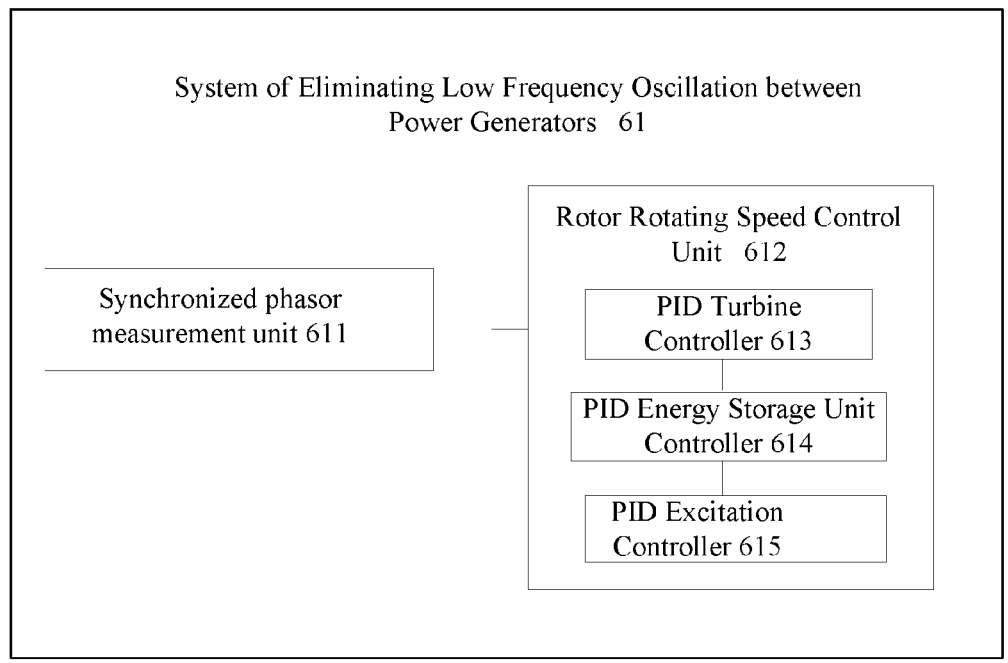
FIG. 6 is an illustration of the system of eliminating low frequency oscillation between generators according to an embodiment of the present invention.

Referring to FIG. 6 of the drawings, the system for eliminating low-frequency oscillation between generators 61 comprises: a synchronized phasor measurement unit 611 and a rotor rotating speed control unit 612.

The synchronized phasor measurement unit 611 measures the absolute rotor angle of a power generator. The synchronized phasor measurement unit 611 utilizes synchronized phasor measurement technology to measure the absolute rotor angle. The absolute rotor angle refers to the leading angle of the internal potential Eq of the power generator from GPS reference vectors.

The rotor rotating speed control unit 612 controls the rotating speed of the rotor of the power generator such that when each time the GPS pulse per second signal arrives, the absolute rotor angle being measured are the same, or the value of the absolute rotor angle is reverted to a target absolute rotor angle after disturbance.

The rotor rotating speed control unit 612 comprises: PID turbine controller 613; the PID turbine controller 613 adjusts the position of the regulating valve of the turbine based on parameters inputted, controls the mechanical power output of the turbine, increases or decreases the rotating speed of the rotor, thereby the value of the absolute rotor angle is reverted to the target absolute rotor angle after disturbance; the parameters include: absolute rotor angle, the target absolute rotor angle.

The rotor rotating speed control unit 612 comprises a PID energy storage unit controller 614. The PID energy storage unit controller 614 controls the energy storage unit to enter into power storage mode or power generating mode, changes the output power of the power generator, increases or decreases the rotating speed of the rotor, thereby the value of the absolute rotor angle is reverted to the target absolute rotor angle after disturbance. The parameters include: the absolute rotor angle, the target absolute rotor angle.

The energy storage unit consumes extra electromagnetic power when storing energy such that the speed of the power generator rotor is reduced, while the energy storage unit provides electromagnetic power under the power generating mode and reduces the loading of the power generator such that the speed of the power generator rotor is increased.

The rotor rotating speed control unit 612 comprises: a PID excitation controller 615. The PID excitation controller 615 controls an exciter to adjust the excitation voltage based on parameters inputted, changes the internal potential and output power of the power generator, increases or decreases the rotating speed of the rotor, thereby the value of the absolute rotor angle is reverted to the target absolute rotor angle after disturbance. The parameters include: the absolute rotor angle, the target absolute rotor angle.

The method and system of eliminating low frequency oscillation between generators of the present invention can ensure that the position of the power generator rotor remain unchanged in the rotating coordinate system determined by PPS. In the electrical system, zero steady state error control of frequency and absolute rotor angle is achieved. Under the condition of not requiring remote measurement, the method and system can provide better suppression of low frequency oscillation. In addition, automatic local balance of active power is achieved when load changes, power fluctuation in the transmission lines is decreased and safe and stable operation of large scale interconnected electric grids is ensured.

The system and method of the present invention can be implemented by many embodiments. For example, the system and method of the present invention can be implemented through software, hardware and fixed components, or any combination of software, hardware and fixed component. The above sequence of steps utilized in the method is merely used for description and the steps in the method of the present invention is not restricted by the above sequence of description, unless particularly described in other ways. In addition, in some embodiments, the embodiment of the present invention can be a program recorded in a recording medium. These programs include machine readable command for implementing the method of the present invention. Thus, the present invention also covers the recording medium which stores and executes the program based on the method of the present invention.

The description of the present invention is provide to illustrate the examples and detailed description, but is not exhaustive and limiting. Many amendments and changes are obvious to one skilled in the art. The embodiments selected for description is used to better illustrate the principles and application of the present invention, and for the one skilled in the art to understand the present invention and design the invention of particular use with different modifications of different embodiments.

What is claimed is:

1. A method of eliminating low frequency oscillation between generators comprising the steps of:
    measuring an absolute rotor angle of a power generator; the absolute rotor angle refers to a leading angle of an internal potential Eq of the power generator from GPS reference vectors in a rotating coordinate system;
    controlling a rotating speed of a rotor of the power generator such that when each time the GPS pulse per second signal arrives, the absolute rotor angle being measured are equal to a target absolute rotor angle, or a value of the absolute rotor angle is reverted to the target absolute rotor angle after disturbance.

2. The method according to claim 1, further comprising the steps of: adjusting a rotating speed of the rotor through control and adjustment in mechanical power output of turbine or output power of the power generator.

3. The method according to claim 2, further comprising the steps of: PD or PID turbine controller adjusting a position of a regulating valve of the turbine based on parameters inputted, controlling the mechanical power output of the turbine, increasing or decreasing the rotating speed of the rotor, thereby the value of the absolute rotor angle is reverted to the target absolute rotor angle after disturbance; the parameters include: the absolute rotor angle, the target absolute rotor angle.

4. The method according to claim 2, further comprising the steps of: PD or PID controller of an energy storage unit controlling the energy storage unit to enter into a power storage mode or a power generating mode, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

5. The method according to claim 2, further comprising the steps of: PD or PID excitation controller controlling an exciter to adjust an excitation voltage based on parameters inputted, changing the internal potential and output power of the power generator, increasing or decreasing the rotating speed of the rotor, thereby the value of the absolute rotor angle is reverted to the target absolute rotor angle after disturbance;
    the parameters include: the absolute rotor angle, the target absolute rotor angle.

6. The method according to claim 2, further comprising the steps of: PD or PID controller of an adjustable power consuming unit controlling the adjustable power consuming unit to a different power consuming level, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

7. A system of eliminating low frequency oscillation between generators, comprising:
   a synchronized phasor measurement unit, arranged for measuring an absolute rotor angle of a power generator; the absolute rotor angle refers to a leading angle of an internal potential Eq of the power generator from GPS reference vectors in a rotating coordinate system;
   a rotor rotating speed control unit, arranged for controlling a rotating speed of the rotor of the power generator such that when each time the GPS pulse per second signal arrives, the absolute rotor angle being measured are equal to a target absolute rotor angle, or a value of the absolute rotor angle is reverted to the target absolute rotor angle after disturbance.

8. The system according to claim 7, wherein the rotor rotating speed control unit adjusts a rotating speed of the rotor through control and adjustment in mechanical power output of turbine or output power of the power generator.

9. The system according to claim 8, wherein the rotor rotating speed control unit comprises a PD or PID turbine controller;
   the PD or PID turbine controller adjusting a position of a regulating valve of the turbine based on parameters inputted, controlling the mechanical power output of the turbine, increasing or decreasing the rotating speed of the rotor, thereby the value of the absolute rotor angle is reverted to the target absolute rotor angle after disturbance;
   the parameters include: the absolute rotor angle, the target absolute rotor angle.

10. The system according to claim 8, wherein the rotor rotating speed control unit comprises a PD or PID energy storage unit controller;
    the PD or PID controller controlling the energy storage unit to enter into a power storage mode or a power generating mode, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

11. The system according to claim 8, wherein the rotor rotating speed control unit comprises a PD or PID excitation controller;
    the PD or PID excitation controller controlling an exciter to adjust an excitation voltage based on parameters inputted, changing the internal potential and output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

12. The system according to claim 8, wherein the rotor rotating speed control unit comprises a PD or PID adjustable power consuming unit controller;
    the PD or PID controller controlling the adjustable power consuming unit to a different power consuming level, changing the output power of the power generator, increasing or decreasing the rotating speed of the rotor, thereby the value of the absolute rotor angle is reverted to the target absolute rotor angle after disturbance; the parameters include: the absolute rotor angle, the target absolute rotor angle.

* * * * *